United States Patent [19]

Sherman

[11] Patent Number: 4,870,780

[45] Date of Patent: Oct. 3, 1989

[54] AGRICULTURALLY USED RODENT BAIT STATION WITH SIGNAL WAND

[76] Inventor: Daniel A. Sherman, 1355 Bobolink Pl., Los Angeles, Calif. 90069

[21] Appl. No.: 313,881

[22] Filed: Feb. 23, 1989

[51] Int. Cl.⁴ ............................................. A01M 1/20
[52] U.S. Cl. .................................... 43/131; 43/132.1
[58] Field of Search ......................... 43/1, 131, 132.1

[56] References Cited

U.S. PATENT DOCUMENTS

| | | | |
|---|---|---|---|
| 2,923,039 | 2/1957 | Imus | 43/131 |
| 3,427,743 | 2/1969 | Brunner | 43/131 |
| 4,413,440 | 11/1983 | Schultz | 43/131 |

Primary Examiner—Nicholas P. Godici
Assistant Examiner—Michael William Starkweather

[57] ABSTRACT

This invention relates to the containment of a poisoned rodent bait in a manner that isolates the bait from exposure to non target species and in a manner that allows the bait to be placed among agricultural crops with ease and efficiency. The rodent bait station contains a number of unique features that will allow agricultural users to identify the location of the stations for servicing with ease and speed, and provides for a method of securing the station to the ground that is integral to the construction of the station itself. Its novel shape allows for the placement of the bait stations in and among thickly grown vegetation, and in areas that are most likely to contain rodent harborages. The rodent bait station is designed as an entire system of rodenticide placement that incorporates features for the dispensing of bait, and for the operation of a large scale rodent elimination in difficult climatic and environmental conditions.

5 Claims, 5 Drawing Sheets

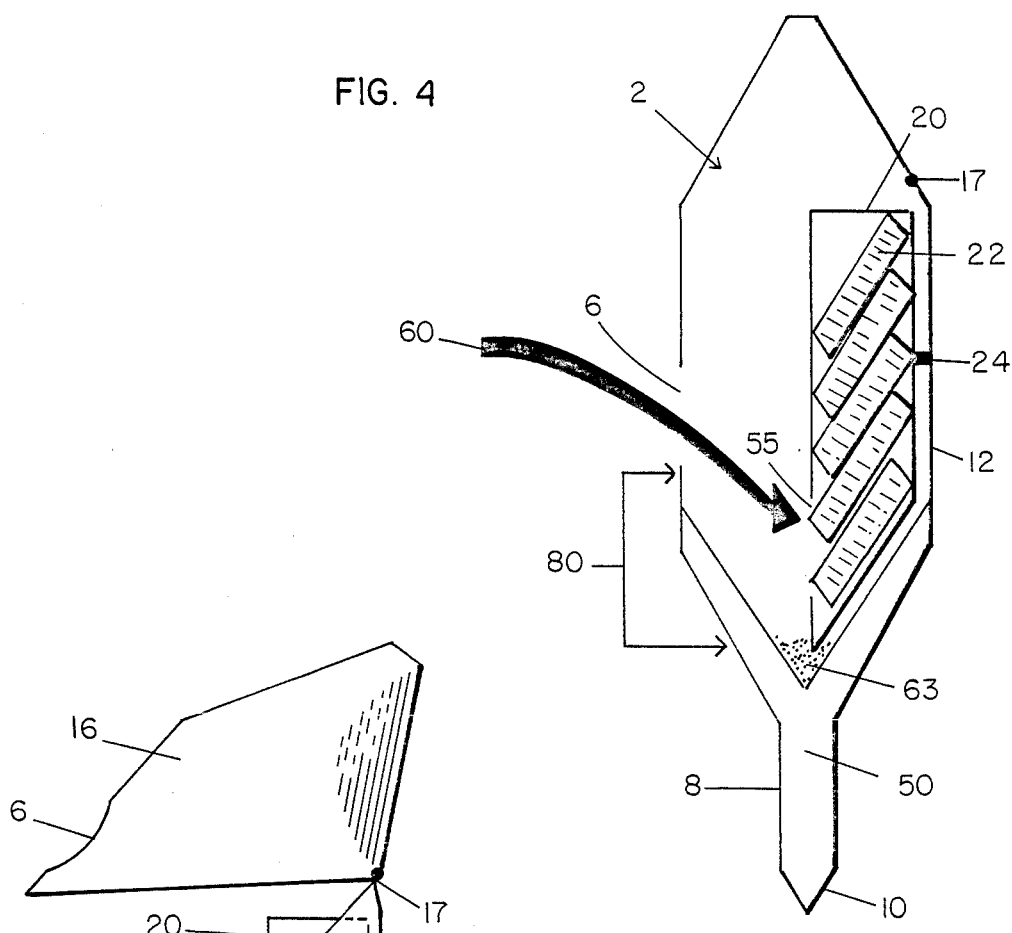
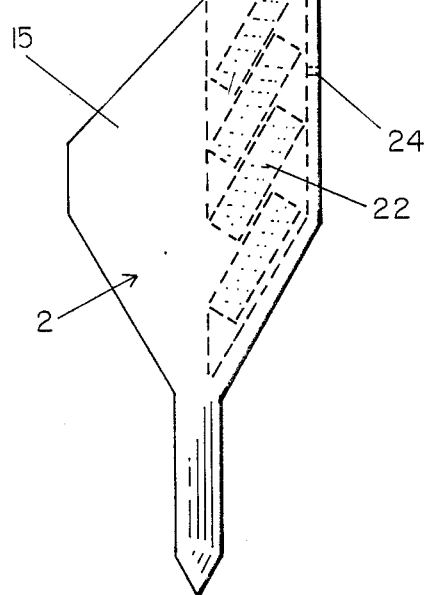
FIG. 4
FIG. 5

4,870,780

AGRICULTURALLY USED RODENT BAIT STATION WITH SIGNAL WAND

BACKGROUND OF THE INVENTION

The use of rodenticides in the control of rodents has become more and more popular over the past few years. With the introduction of "one feed" anti-coagulant rodenticides, pest control operators have been able to control active rodent infestations with a minimum use of poison however, the more "active" toxins represent a real and present danger to non-target species.

Many devices have been brought out to shield these rodenticides from contact with children and pets and are presented as "tamper-resistant" or tamper-proof in order to meet the criteria that have been established by the U.S. Environmental Protection Agency.

The deficiency in these devices are based upon the assumption that they are going to be used in urban and controlled environments, and none of the devices have been designed to accommodate the farmer or agricultural user in a manner that would allow his placement of poisoned bits among crops.

Of the past inventions that have received patents a number stand out as typical of the type of "tamper-resistant" device that have been designed to isolate toxins from the public. These are represented by U.S. Patents in Class 43/131 such as U.S. Pat. Nos. 4,349,981 9/1982 Sherman—4,031,653 6/1977 Jordan—4,161,079 7/1979 Hill—4,648,201 3/1987 Sherman—4,541,198 9/1985 Sherman—Foreign Patent Nos. 9917388 5/1968 Netherlands and 2111022 9/1972 Federal Republic of Germany.

While these devices provide excellent protection and isolation, they lack the ability to be realistically used in farm and agricultural situations.

The purpose of the instant invention is to provide farmers a method of dispersing baits among crops and livestock in a manner that is consistent with their normal farming operations.

Another object of the invention is to provide a method of isolating bait from non-target wildlife and to present the bait in a manner that will make it attractive to the target rodent population.

Still another object of the instant invent is to provide a weather proof container for the storage and presentation of the rodenticide.

And yet another feature of the invention is to provide a means of securing the bait station to the ground as an integral part of the construction of the baiter while allowing for ease of retrieval and replenishment of the bait as it becomes necessary.

And, the invention allows for the use of a highly visible method of spotting the bait stations when they have been placed among growing crops by the utilization of a novel signal device and highly visible color.

These and other feature of the instant invention will become obvious when viewed in connection with the following drawing and disclosures. The disclosures will teach a totally new method of bait placement and will open the use of rodenticide products to a formally ignored market.

BRIEF DESCRIPTION OF THE DRAWINGS

FIG. 4 is a side view that demonstrates the positioning of the interior bait holder in relation to the interior space provided by the baiter's overall construction. The relative relationship of the bait holder and the entrance portal is demonstrated as well as the funnel shape of the bottom interior portion of the baiter that allows for the collection of spilled bait or for the insertion of an insecticide powder to prevent insect attack of the rodenticide. The ground stake is shown as a reinforced lower wall and the travel path of the rodent to the bait is indicated by following the arrow drawn from the exterior to the interior bait holder.

In FIG. 5 we see a side view of the baiter with the structure being hinged to allow for the loading of additional bait. The reltionship of the various elements are demonstrated in cooperation with the hinged top and the staked bottom.

DETAILED DESCRIPTION OF THE DRAWINGS

Figure 1:
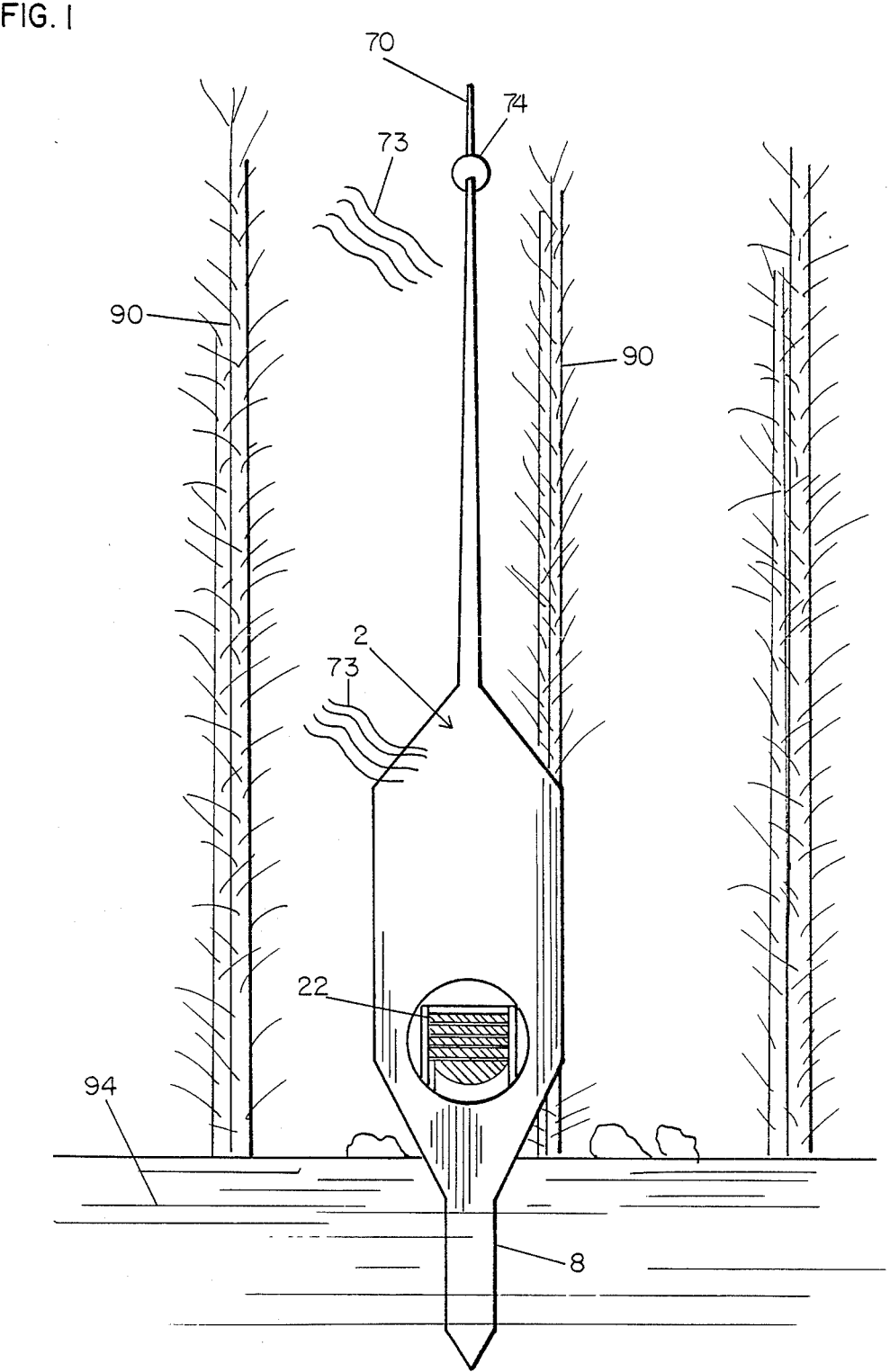
FIG. 1 demonstrates the use of the baiter in a fixed ground use situation with the lower pin set into the earth to position the baiter in place and we see the opening for the rodent to enter and feed on the bait. The upper portion of the baiter has affixed an extension signal pole colored in a bright hue that allows the baiter to be spotted among the growing crops. Affixed to the pole is a disk that cooperates with a mechanical baiter picker to remove the bait station automatically at the time of harvesting.

In FIG. 1 we see the baiter 2 mounted into the earth 94 by use of the mounting stake 8 having been pressed firmly into the ground 94. The baiter 2 is then held into an upright vertical position so that the rodent entrance exposes the bait blocks 22 in a manner that is accessible and attractive to a target rodent. Placed among crop such as 90 and fabricated in a bright non-crop color 73 the bait station and its signal wand 70 is easily seen to those who will be required to check and replenish the bait 22. At the top of the signal wand 70 has been included a disk 74 that will be used in cooperation with a mechanical extraction device to be described later. The signal wand 70 is optional and is only used when the crops 90 are grown higher or thicker then the bait 2 and can be omitted when the baiter 2 is used near an open road or in proximity to a man made structure at which point the color 73 itself would identify the baiter's 2 location.

Figure 2:
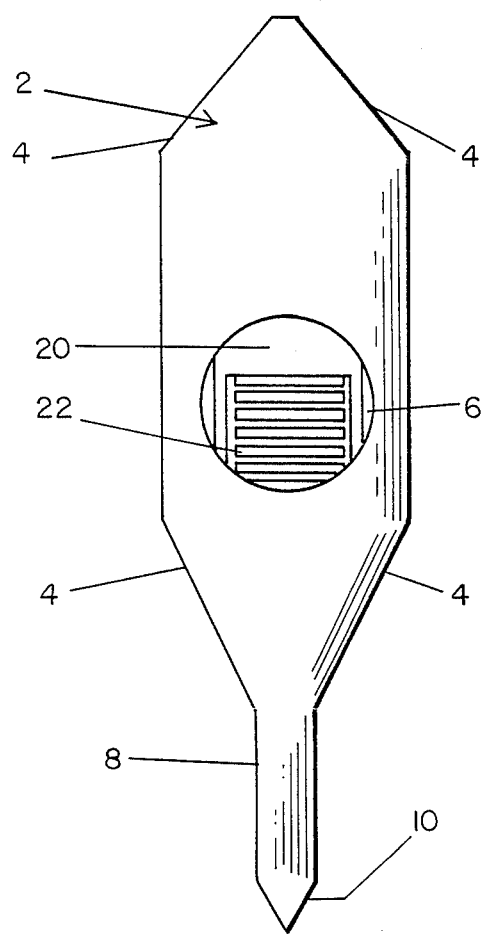
In FIG. 2 we see a close up of the structure of the baiter. Shown is the conical shape that tapers to a pointed peg at its bottom and upward into an inverted funnel. An entrance portal in shown at the front of the unit and positioned in the rear interior portion of the baiter opposing the entrance portal is the rodenticide bait in its own container.

FIG. 2 is a detailed perspective of the baiter 2 showing the relationships of various elements of the baiter. We see the basic rodent entry point 6 that opposes an independent bait holder 20 which contains a rodenticide material 22. The conical shape of the baiter 2 is formed by the top and bottom slopes 4 which taper at the bottom into the mounting stake 8 containing a sharp pin 10 for penetrating the earth and holding the structure of the baiter 2 in an upright and secure position. It should be noted that the upright conical shape formed by the rounded wall of the baiter 2 and the taper 4, when used in conjunction with the mounting stake 8 provide the most possible aerodyamically stable structure when the baiter 2 is exposed to high winds in open crop of growing environments.

Figure 3:
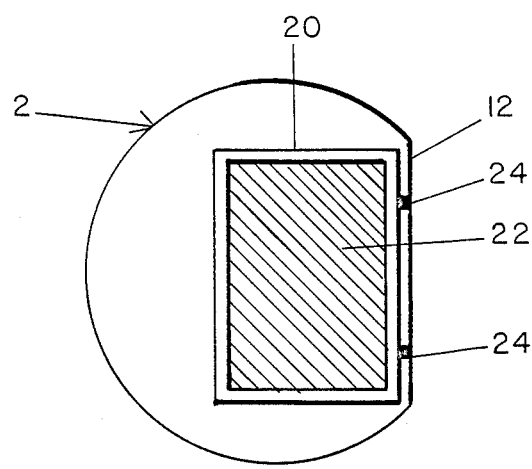
FIG. 3 is a top view of the structure of the baiter showing an independent bait holder placed against the flat back surface of the interior of the baiter and opposing the entrance portal.

FIG. 3 show a top view cutaway of the baiter 2 giving the relative positions of the interior structures of the baiter 2. A flat surface 12 is provided to allow an independent bait holder 20 containing the rodenticide material 22 to be held firmly in place against the wall opposing the rodent entrance. This holder 20 is held against the flat surface 12 by several methods that can include a Velcro fastener, an adhesive strip, a pin and slot, etc, all designated as 24.

In FIG. 4 we see a side view of the baiter 2 in an upright position as it might be mounted into the ground. Opposing the rodent entry portal 6 is the independent bait holder 20 containing the rodenticide 22 and held against the flat rear wall 12 by the fastener of choice 24. Demonstrated is that a rodent feeding through the portal formed as 6 would have entry to the bait 22 by placing its head through the portal 6 along the lines of 60 and by feeding through the breach formed in the independent bait holder 20 at point 55. Also depicted in this cutaway side view of the baiter 22 is the bottom interior angle 80 that forms to a trough in order to prevent the spillage of rodenticide 22 should it become loose from the bait holder 20 or, if the bait were in a paraffinized form, melt down and pour from the holder 22. Since the design of the independent bait holder 20 is set back from the center of the interior of the bait 2, a small amount of insecticide 63 can be added to the bottom of the baiter 2 to prevent insects from attacking the bait 22 located at the rear of the baiter 22 and in the bait holder 20. We also note that the mounting stake 8 is solid 50 in construction and that the pin 10 cooperates with this solid structural form to provide an adequate mount when placed in the ground. Noted in this drawing is a hinge point 17 that allows the baiter 2 to be opened for re-servicing and filling with additional bait.

FIG. 5 is a side perspective of the baiter 2 showing how the top element 16 has been opened along the hinge line 17 to separate from the bottom element 15. The baiter 2 still remains in a vertical position as if mounted into the earth and the independent bait holder 20 can know be remove from its fastening points 24 for replenishment of the rodenticide 22. The portal 6 which is part of the element 16 is in a upright position in relation to the bottom element 15. This allow the integrity of the bottom elements 15 trough to remain intact during servicing.

Figure 6:
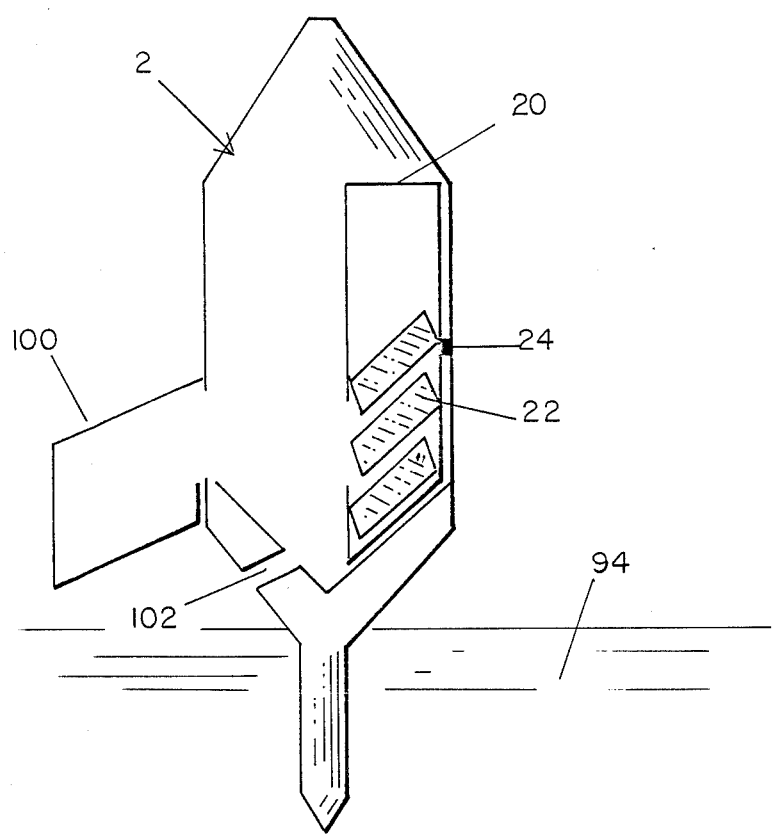
In FIG. 6 we see demonstrated the use of a front tunnel structure to extend the distance from the interior bait holder to the entrance portal. Also demonstrated is the addition of a seepage port at the bottom of the baiter's interior portion that will allow water to seep out if it enters the baiter's structure.

In FIG. 6 we see an alternative construction of the baiter 2 for use in areas where high rainfall or frequent non-target incursion might be a problem. An extended portal cover in the shape of a rounded tube 100 has been added to the entry portal 6 to block rain and non target animal from easily reaching the rodenticide bait 22. The unit is ground mounted in the earth 94 and the extension tunnel 100 run directly along the earth 94 to provide a low silhouette entry portal and access to the bait 22. Also added is a drain port 102 to allow excess water that might accumulate at the bottom of the baiter to drain off before it can reach the bait 22 located in the independent bait holder.

Figure 7:
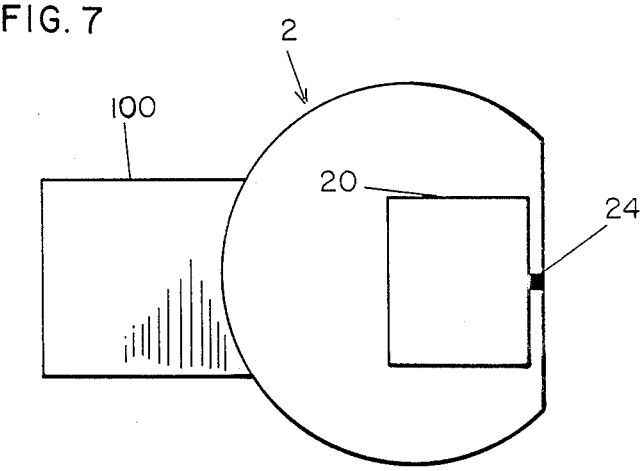
FIG. 7 is a top view of the baiter with the extended front tunnel and shows how the bait holder is further isolated from the outside environment by the use of this extension.

FIG. 7 show the extended tunnel 100 on the baiter 2 and the added distance that it gives from the independent bait holder 20 which has been fastened on to the opposing wall by 24.

Figure 8:
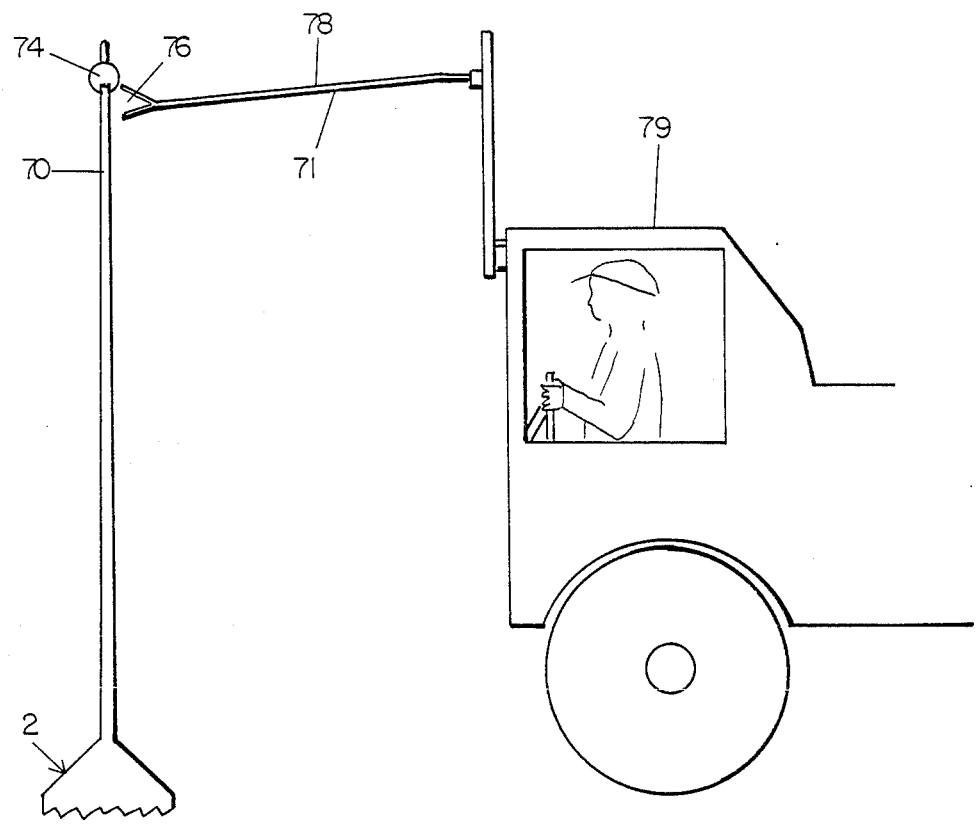
FIG. 8 shows a preferred method of extracting the baiters from the ground using a mechanical pickup device designed to grab the plate that has been attached to the signal wand extending from the top of the baiter.

FIG. 8 deals with a mechanical means of extraction of the baiters at the time of harvesting. The baiter 2 is equipped with the signal wand 70 to which a circular plate 74 has been added prior to the harvester 79 reaching the point of impact with the baiter 2 an arm 78 extending from the harvester and carrying a fork 76 grabs the point under the plate 74 and passes the baiter 2 along the arm 78 and through a channel 71 formed in the arm 78.

Figure 9:
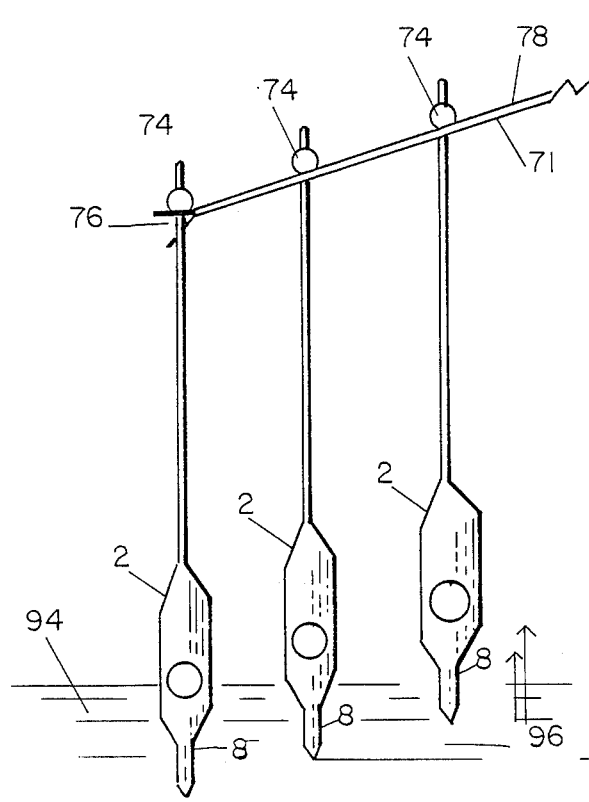
FIG. 9 shows a multitude of baiters being picked up and pushed along the extracting arm by utilizing the signal wand and the mechanical extraction system.

FIG. 9 details the collection of the baiters 2 as they pass up the arm 78 towards the harvester 75 and shows that a multitude of baiters 2 can be collected through the channel 71. The baiters 2 a pulled from the earth 94 in the direction of 96 and the pins 8 having been pulled free from the earth 94 allow the freed baiters 2 to slide along the channel 71 with the plate 74 guiding them along to the end of the collection point.

What I claim is:

1. A rodent bait station; said station having a vertical conical geometrical shape; said geometrical shape being spherical in dimension, said sphere being breached by a portal leading to an interior chamber; said chamber containing an independent bait holder; said bait holder being capable of being mounted to an interior wall by a plurality of means; said station having an interior wall rising to form an interior pyramid at its top; the exterior of said pyramid having a removable signal wand extending upward; said signal wand having a disk capable of being picked up by an independent mechanical picking device; said station having an interior wall dropping to form a v-shaped chamber at its bottom; the exterior of said bottom v-shaped chamber having an extension forming an elongated peg that is integral to said station for mounting said baiter into the ground; said station having two elements that cooperate to allow for the opening of said station to allow the addition of additional rodent bait.

2. A rodent bait station as in claim 1; said bait station having a brightly colored exterior to allow for the easy identification of the location of said station.

3. A rodent bait station as in claim 1; said bait station having a drainage port in its lower portion capable of eliminating moisture that may form at the bottom of said station.

4. A rodent bait station as in claim 1; said bait station having an elongated tunnel structure emanating from it entrance portal to extend the distance from said portal to its interior bait holder.

5. A rodent bait station as in claim 1; said bait station having a v-shaped interior structure at its lowest point; said v-shaped structure capable of holding an amount of insecticide that isolates its independent bait holder from contact with crawling insects.

* * * * *